(12) United States Patent
Baikov

(10) Patent No.: US 7,698,684 B2
(45) Date of Patent: Apr. 13, 2010

(54) METHOD AND SYSTEM FOR GENERATING SCHEMA TO JAVA MAPPING DESCRIPTORS AND DIRECT MAPPING OF XML SCHEMA AND JAVA INTERFACES

(75) Inventor: Chavdar S. Baikov, Sofia (BG)

(73) Assignee: SAP AG, Walldorf (DE)

( * ) Notice: Subject to any disclaimer, the term of this patent is extended or adjusted under 35 U.S.C. 154(b) by 913 days.

(21) Appl. No.: 11/238,921

(22) Filed: Sep. 28, 2005

(65) Prior Publication Data

US 2007/0073753 A1    Mar. 29, 2007

(51) Int. Cl.
G06F 9/44 (2006.01)
G06F 7/00 (2006.01)

(52) U.S. Cl. .................. 717/118; 717/109; 717/136; 707/102

(58) Field of Classification Search .............. 717/100, 717/105, 109–119, 128, 136; 707/102
See application file for complete search history.

(56) References Cited

U.S. PATENT DOCUMENTS

| | | | |
|---|---|---|---|
| 7,159,224 B2 | 1/2007 | Sharma et al. | |
| 7,184,922 B2 | 2/2007 | Ousley et al. | |
| 7,231,435 B2 | 6/2007 | Ohta | |
| 7,277,935 B2 | 10/2007 | Sato | |
| 7,284,039 B2 | 10/2007 | Berkland et al. | |
| 7,373,661 B2 | 5/2008 | Smith et al. | |
| 7,409,709 B2 | 8/2008 | Smith et al. | |
| 7,421,495 B2 | 9/2008 | Yang et al. | |
| 7,467,162 B2 | 12/2008 | Rosenbloom et al. | |
| 2001/0029604 A1* | 10/2001 | Dreyband et al. | ............. 717/7 |
| 2002/0143819 A1 | 10/2002 | Han et al. | |
| 2003/0004746 A1 | 1/2003 | Kheirolomoom et al. | |
| 2003/0005181 A1 | 1/2003 | Bau et al. | |
| 2003/0055878 A1 | 3/2003 | Fletcher et al. | |
| 2003/0084056 A1 | 5/2003 | DeAnna et al. | |
| 2003/0110242 A1 | 6/2003 | Brown et al. | |
| 2003/0110373 A1 | 6/2003 | Champion | |
| 2003/0163450 A1* | 8/2003 | Borenstein et al. | ............. 707/1 |
| 2003/0191803 A1 | 10/2003 | Chinnici et al. | |
| 2003/0208505 A1* | 11/2003 | Mullins et al. | ............. 707/102 |
| 2004/0015564 A1 | 1/2004 | Williams | |
| 2004/0017392 A1 | 1/2004 | Welch | |

(Continued)

FOREIGN PATENT DOCUMENTS

EP    1318461    6/2003

(Continued)

OTHER PUBLICATIONS

Object-oriented database access via reflection, Ege, R.K.; IEEE, 1999, pp. 36-41.*

(Continued)

*Primary Examiner*—Wei Y Zhen
*Assistant Examiner*—Satish Rampuria
(74) *Attorney, Agent, or Firm*—Schwegman, Lundberg & Woessner, P.A.

(57) ABSTRACT

A method and system for generating schema to Java™ mapping description. In one embodiment, default schema to Java™ mapping information is customized into customized schema to Java™ mapping information. An object having the customized mapping information is created, and schema to Java™ generation is initialized via the object.

13 Claims, 14 Drawing Sheets

U.S. PATENT DOCUMENTS

| | | |
|---|---|---|
| 2004/0045005 A1 | 3/2004 | Karakashian |
| 2004/0054969 A1 | 3/2004 | Chiang et al. |
| 2004/0068554 A1 | 4/2004 | Bales et al. |
| 2004/0088352 A1 | 5/2004 | Kurth |
| 2004/0181537 A1 | 9/2004 | Chawla et al. |
| 2004/0199896 A1 | 10/2004 | Goodman et al. |
| 2005/0114394 A1* | 5/2005 | Kaipa et al. ............ 707/104.1 |
| 2005/0138041 A1 | 6/2005 | Alcorn et al. |
| 2005/0154785 A1 | 7/2005 | Reed et al. |
| 2005/0216488 A1 | 9/2005 | Petrov et al. |
| 2005/0246656 A1 | 11/2005 | Vasilev et al. |
| 2005/0273703 A1* | 12/2005 | Doughan ................ 715/513 |
| 2005/0278270 A1 | 12/2005 | Carr et al. |
| 2006/0015625 A1 | 1/2006 | Ballinger et al. |
| 2006/0029054 A1 | 2/2006 | Breh et al. |
| 2006/0041636 A1 | 2/2006 | Ballinger et al. |
| 2006/0136351 A1 | 6/2006 | Angrish et al. |
| 2006/0200749 A1 | 9/2006 | Shenfield |
| 2006/0206890 A1 | 9/2006 | Shenfield et al. |
| 2006/0236302 A1 | 10/2006 | Bateman et al. |
| 2006/0236306 A1 | 10/2006 | DeBruin et al. |
| 2007/0064680 A1 | 3/2007 | Savchenko et al. |
| 2007/0073760 A1 | 3/2007 | Baikov |
| 2007/0073769 A1 | 3/2007 | Baikov et al. |
| 2007/0073771 A1 | 3/2007 | Baikov |
| 2007/0073849 A1 | 3/2007 | Baikov |
| 2007/0118844 A1 | 5/2007 | Huang et al. |
| 2007/0156872 A1 | 7/2007 | Stoyanova |
| 2007/0245167 A1 | 10/2007 | De La Cruz et al. |
| 2008/0189713 A1 | 8/2008 | Betzler et al. |

FOREIGN PATENT DOCUMENTS

| | | |
|---|---|---|
| EP | 1387262 | 2/2004 |
| WO | WO-03073309 A1 | 9/2003 |

OTHER PUBLICATIONS

A Web-services architecture for efficient XML data exchange, Amer-Yahia, S.; Kotidis, Y.; IEEE, 2004, pp. 1-12.*

Mapping XML DTDs to relational schemas, Abdel-aziz, A.A.; Oakasha, H.; IEEE, 2005, pp. 1-4.*

Bitstream Binding Language – Mapping XML Multimedia Containers into Streams, Thomas-Kerr, J.; Burnett, I.; Ciufo, P.; IEEE, 2005, pp. 1-4.*

"The J2EE Tutorial: Web Application Archives", Sun.com, sun.com/j2ee/tutorial/1-3-fcs/doc/WCC3.html, 1-4.

Banerji, A., et al., "Web Services Conversation Language (WSCL) 1.0", *W3C Note, World Wide Web Consortium*, URL http://www.w3.org/TR/wscl10/, (Mar. 2002).

Bussler, Christopher, et al., "A conceptual architecture for semantic web enabled services", Dieter Fensel, Alexander Maedche, *ACM SIGMOD Record*, v. 31, n. 4, (Dec. 2002), 6 pgs.

Dustdar, Schahram, et al., "A View Based Analysis on Web Service Registries", Martin Treiber, *Ditributed and Parallel Databases*, v. 18, n.2, (Sep. 2005), 147-171.

Huhns, Michael N., et al., "Service-Oriented Computing: Key Concepts and Principles", *IEEE Internet Computing*, Munindar P. Singh, v.9, n.1, (Jan. 2005), 75-81.

Hull, Richard, et al., "Tools for Composite Web Services: A Short Overview", Jianwen Su, *ACM SIGMOD Record*, v. 34, No. 2, (Jun. 2005), 10 pgs.

Shepherd, George, et al., "Programming with Microsoft Visual C++. Net", *Microsoft Press Sixth Edition*, (2003), 391-397, 771, 806-807, 820-826.

* cited by examiner

METHOD AND SYSTEM FOR GENERATING SCHEMA TO JAVA MAPPING DESCRIPTORS AND DIRECT MAPPING OF XML SCHEMA AND JAVA INTERFACES

TECHNICAL FIELD

Embodiments of the invention generally relate to the field of web services and, more particularly, to generating schema to Java™ mapping descriptors and employing direct mapping of interfaces.

BACKGROUND

Efforts are being made to more easily conduct business in a web-based environment. "Web Services" is loosely understood to mean the ability to discover and conduct business in a web-based environment. For example, a user (e.g., a web-based application or person with a web browser) may: 1) search through an online registry of businesses and/or services; 2) find a listing in the registry for web based access to a service that that the user desires to have performed; and then, 3) engage in a web based business relationship with the service application including the passing of relevant information (e.g., pricing, terms, and conditions) over the network. In other words, web services generally refer to offerings of services by one application to another via the World Wide Web.

Given the nature and use of web services and the rapid increase in their demand, interoperability of web services across clients and servers is becoming increasingly important and cumbersome. Some attempts have been made to achieve interoperability across a wide range of platforms and runtimes. For example, using open standards like extensible Markup Language (XML), Simple Object Access Protocol (SOAP), Web Services Description Language (WSDL), and Universal Description, Discovery, and Integration (UDDI), some interoperability has been achieved.

FIG. 1 illustrates a prior art web services platform 100. The platform 100 shows various XML-related standards 102-110 that are used in connection with web services to attempt interoperability. The illustrated standards include XML Namespaces 102, similar to Java™ package names, to provide syntax for data representation in portable format. SOAP 104 refers to a standard packaging format for transmitting XML data between applications over a network. XML schema 106 refers to the World Wide Web Consortium (W3C) schema specification for XML documents. WSDL 108 refers to the standard used for describing the structure of XML data that is exchanged between systems using SOAP 104. Finally, UDDI 110 refers to a standard SOAP-based interface for web services registry and defines a set of web services operations and methods that are used to store and search information regarding web services applications.

However, the open standards are not evolving fast enough to keep up with the increasing demand for web services and needs of additional flexibility and control on the client-side. One of the problems today is the convoluted relationships and mappings between relevant standards. Neither the interoperability nor the client-side flexibility are sufficiently achieved because of the conventional separation of standards, models, and entities for web services (WS) and web services client (WSC). FIG. 2 illustrates a prior art web services model 200. The illustrated web services model 200 includes Web service definition 204, which includes the description of design-time configuration of a web service. Web service configurations 206 refer to the description of the run-time configurations of a web service. The web services model 200 further includes a virtual interface 202. A virtual interface 202 refers to an abstract interface.

Referring now to FIG. 3, it illustrates a prior art web services client model 300. In the illustrated web services client model 300, schema to Java™ (STJ) mappings 302 contain serializer classes and deserializer classes of the XML Schema Definition (XSD) Types. However, the conventional STJ mappings 302 do not contain any field or operation-specific mappings. The conventional model 300 further includes logical ports 304 that are limited to containing merely runtime (RT) relevant configurations and do not contain design-time (DT) configurations. Finally, the illustrated WSDL 306 contains a parsed WSDL structure.

Although the conventional models 200, 300 provide some flexibility, further improvements are needed to achieve interoperability. For example, the conventional model 200 provides provider-oriented inside-out approach for web services, but it does not support consumer-based outside-in approach for web services, which is becoming increasingly important. The conventional models 200, 300 do not provide similar modeling approach for developing web services and web services client which leads to usability deficiencies.

SUMMARY

A method and system are provided for generating schema to Java™ mapping descriptors and direct mapping of XML schema and Java™ interfaces. In one embodiment, default schema to Java™ mapping information is customized into customized schema to Java™ mapping information. An object having the customized mapping information is created, and schema to Java™ generation is initialized via the object.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1:
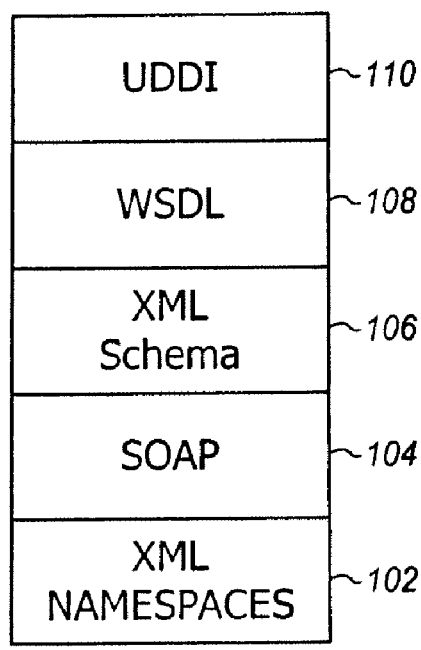
FIG. 1 illustrates a prior art web services platform.
Figure 2:
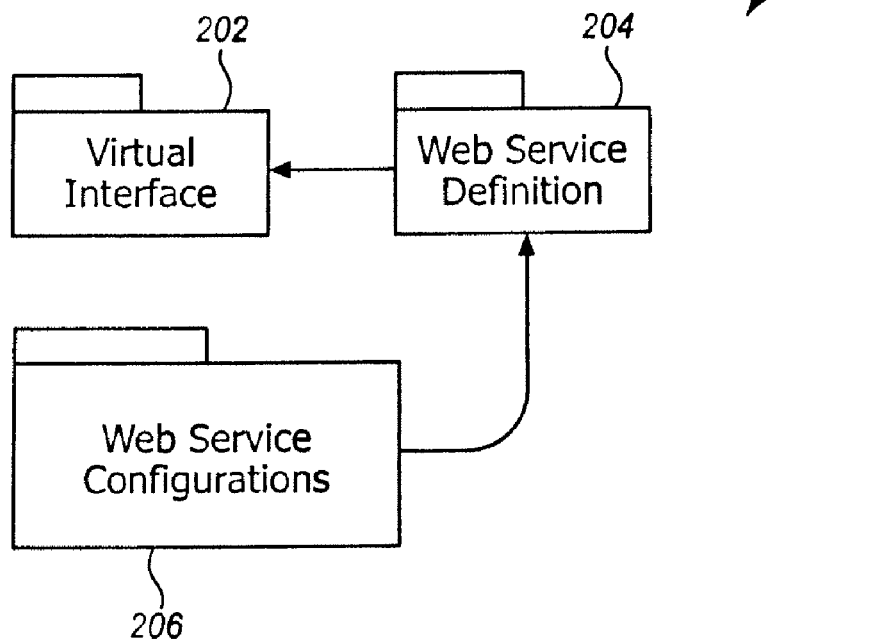
FIG. 2 illustrates a prior art web services model.
Figure 3:
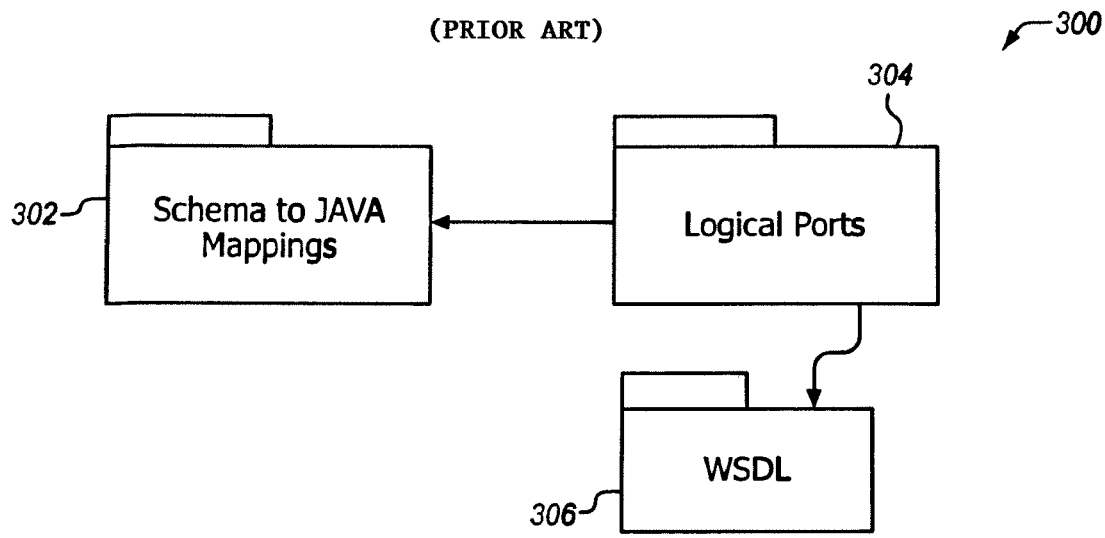
FIG. 3 illustrates a prior art web services client model.

Described below is a system and method for generating schema to Java™ mapping descriptors and for employing direct mapping of XML schema and Java™ interfaces. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), Digital Video Disk ROM (DVD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 4:
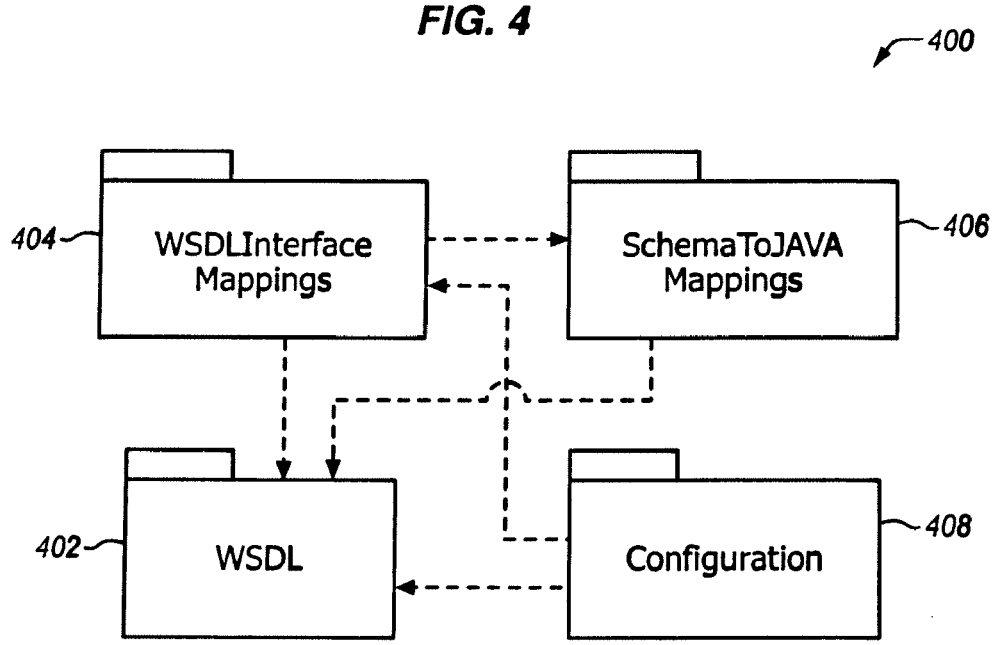
FIG. 4 illustrates an embodiment of a common meta model for web services and web services client.

FIG. 4 illustrates an embodiment of a common meta model 400 for web services and web services client. In the illustrated embodiment, a common web services meta model 400 is generated by combining various models 402-408 into a single common model (common model) 400. For example, the common model 400 includes a WSDL model 402, which refers to a model for describing the WSDL structure of the web services that are developed within an application, and/or WSDL files that are used to generate WS client proxies. The WSDL model 402 may also contain WSDL relevant extensions. The WSDL interface mappings (WSDL IM) model 404 refers to a model for describing mappings between the Java™ Service Endpoint (JSE) Interface (e.g., generated proxy service interface) and its WSDL representation, such as the names of the Java™ method and WSDL operation representing the method, default values of parameters, etc.

The illustrated Schema to Java™ mappings model 406 is used for describing mappings between XSD types and Java™ classes representing these types, such as the names of the fields. The configuration model 408 includes the design-time and runtime configuration of web services and web services client. The configuration model 408 logically references the WSDL model 402 and the WSDL IM model 404, which, in turn, references the STJ mappings model 406.

As illustrated, in one embodiment, a common model 400 is provided for WS and WSC frameworks to perform development, deployment and configuration of applications with relative ease. WS and WSC frameworks may reside on a Java™ 2 Enterprise Edition (J2EE) engine. In one embodiment, the common model 400 is migrated to the J2EE engine to run and use the WS/WSC proxy on the J2EE engine to provide a common model for WS and WSC frameworks. Such migration can be performed using various migration controllers and interfaces that are used for application development. In one embodiment, the common configuration is achieved by having a common configuration entity in the configuration model 408. Common design utilities are provided using a common interface mapping model 404 and a common schema to Java™ mapping model 406, while common deployment entities are provided with insignificant differences between client and server.

In one embodiment, common models 402-408 are managed by a common framework at the J2EE engine. The common model 400 is created by, first, identifying those elements, features, and components (components or properties) that are common to both web services model and web services client model. Once such common components are identified, they are then extracted and put together to create a common WS model. It is contemplated that those components that are necessary and/or preferred are used to create the common framework, while those components that are not regarded as necessary and/or preferred may not be used. Further, the use of such common components helps support the deployment of web services and web services client in a common way. For example, SAP administrative tools model can be converted in light of the common framework to separate the WS tools in the SAP Administrative tools from the J2EE engine because of the different requirements associated with the SAP Administrative tools and the J2EE engine. Examples of administrative tools include various Integrated Development Environment (IDE) tools (e.g., IDE wizard and IDE views) and other SAP-based IDE and administrative tools, such as SAP NetWeaver Developer Studio, SAP Visual Administrator, and SAP NetWeaver Administrator. Further, SAP's IDE can be based on the Eclipse IDE and may contain additional SAP developed plugins.

In the illustrated embodiment, the common model 400 combines the requirements from both the provider and consumer scenarios and is suitable to be used by both the service and client platforms. This is performed such that the common elements of functionality are adopted, while the uncommon elements work side-by-side not only without interfering with each other, but by complementing each other in the common model 400. In one embodiment, common models 402-408 are generated and employed and further, they are directly mapped in a common model 400 via any number of programming languages that are right for the time (e.g., C, C++, C#, Java™, and ABAP). Further, a generator, such as a proxy generator or a code generator, modules, interfaces, and components are employed to form common models 402-408, generate WSDL model, form direct mapping between models 402-408 and between web services interfaces and Java™ interfaces.

The common model 400 eliminates the need for the conventional virtual interface for storing the data (e.g., description of the interface and its types). In one embodiment, web services interface data is separate between the WSDL model 402 and the two mapping models 404, 406. Using this technique, SOAP extensions are not longer necessary as the need for VI to WSDL conversion is eliminated. Using the common model 400, web interfaces are described in the WSDL model 402 as opposed to a virtual interface. Further, the interface mapping information is used to describe the mapping of web interfaces to Java™ interfaces (e.g., Java™ SEI). Then, multiple design time configurations can be attached to a single interface as an alternative.

Furthermore, the web services definition, which can be used to describe an alternative design-time configuration, is made part of the design-time part of the configuration model 408. This helps eliminate the need for generating several portTypes based on the web services definition, which would otherwise be necessary because the configuration would have to be expressed in the form of WSDL extensions. In one embodiment, a WS-policy standard is used to express configuration of web services and consequently, several alternative configurations can be expressed using one WSDL portType. A WS-policy standard can be dynamically created in which various parameters can be defined as necessary or desired. Further, a client proxy generated out of such WSDL may contain a single service endpoint interface (SEI), which has a superior use for the application developer using it as proxy. An SEI can be used to specify methods of the Java™ class that are to be exposed as web services operations, which are included and published in the WSDL model 402 as the portType that a client application uses to invoke web services.

In one embodiment, the STJ mappings model 406 contains not only serializer and deserializer classes, but also other field and operation-specific mappings information. Using the STJ mappings model 406 having such information helps facilitate various kinds of mappings, such as names of getter/setter methods of a specific field, if an attribute is presented as a data member or with getters/setters, etc.

The illustrated WSDL model 402 includes a WSDL file that specifies the WSDL structure, including message formats, Internet protocols, and addresses, that a client may use to communicate with a particular web service. A WSDL document contains sections to describe web services data structures using XML schema. A WSDL document contains various components and elements (e.g., biding, import, message, operation, portType, service, and types) that are rooted in the root element (e.g., definitions element) of the WSDL document. The "types" WSDL element contains XML schemas inlined or references to standalone XSD documents.

The binding element is used to assign portTypes and its operation elements to a particular protocol (e.g., SOAP) and encoding style. The import element is used to import WSDL definitions from other WSDL documents (such as those similar to an XML schema document import element). The message element describes the message's payload using XML schema built-in types, complex types, and/or elements defined in the WSDL document's type elements. The operation and portType elements describe web service's interface and define its methods and are similar to Java™ interfaces and their method declarations. The service element is used for assigning an Internet address to a particular binding. The type element uses the XML schema language to declare complex data types and elements that are used elsewhere in the WSDL document. The WSDL IM model 404 is used for describing the mappings between the Java™ SEI and its WSDL representation.

The STJ mappings model 406 contains a model for describing mappings between XSD types and Java™ classes representing a group of classes and interfaces in Java™ packages, a set of Java™ content interfaces representing the content models declared within the schema, and a set of Java™ element interfaces representing element declarations occurring within the schema.

In one embodiment, the WSDL IM model 404 contains reference to and uses elements of interfaces with the WSDL model 402. The WSDL IM model 404 further contains reference to the STJ mappings model 406. The STJ mappings model 406, on the other hand, references to the WSDL model 402 and uses elements from the WSDL model 402. Examples of the elements that the STJ mappings model 406 uses include elements of XSD and/or type elements, such as complex type and simple type. The configuration model 408 contains reference to the WSDL model 402 and the WSDL IM model 404.

A virtual interface refers to an abstract interface and/or a type description system that is created based on a programming language interface (e.g., Java™ interface and ABAP methods). A virtual interface can be used to decouple the language-specific implementation from interface description. A web service refers to an interface of the web service as described by the WSDL file at the WSDL model 402, which describes web services methods and web services type systems, such as the XML messages transmitted upon the web services invocation. When the web service interface is generated via the virtual interface, it is done by having Java™ classes build the virtual interface to generate the WSDL file (web interface). This process of WSDL generation is carried in the engine by the WS runtime, while the virtual interface contains hints for WSDL generation details called SOAP extensions. A WSDL file provides proxy generator which generates Java™ classes (web services client proxy) and logical ports (that contain web services client configuration). Using the web services client proxy classes, application invoke the web services described by the WSDL file. Also, using logical ports, applications configure the web services client proxy.

In one embodiment, virtual interfaces and the virtual interface model are eliminated by having the web services development based on WSDL (web services interface) at the WSDL model 402 in an outside-in scenario. For example, on the server side, WSDL 402 provides proxy generator which generates default mappings that are then changed (e.g., updated as the desired by the developer or as necessitated) using an administrative tool and/or IDE tool, such as an IDE wizard, SAP Visual Administrator, SAP NetWeaver Developer Studio, etc. This is then used by the proxy generator to generate Java™ beans with mapped Java™ methods and WSDL 402 and mappings and the configuration model 408. A developer can implement methods (logic) of the bean and thus, providing logic to the web services methods. Furthermore, the conventional inside-out scenario can be customized using administrative tools and/or IDE tools to be compatible with the new model 400. For example, in one embodiment, Java™ classes can created a virtual interface that generates default WSDL which proves a proxy generator which further generates default mappings. These default mappings (e.g., default Java™ mappings) are then changed or updated or customized to reflect the original Java™ interface for which the common WS model 400 can be used by using/reusing the outside-in deployment. On the client side, in one embodiment, WSDL at the WSDL model 402 provides a proxy generate which generates Java™ files and mappings and the configuration model 408. This mechanism provides having the same deployment entities for adapting various scenarios (e.g., inside-out and outside-in) and allows the common model 400 for development of such scenarios.

Figure 5:
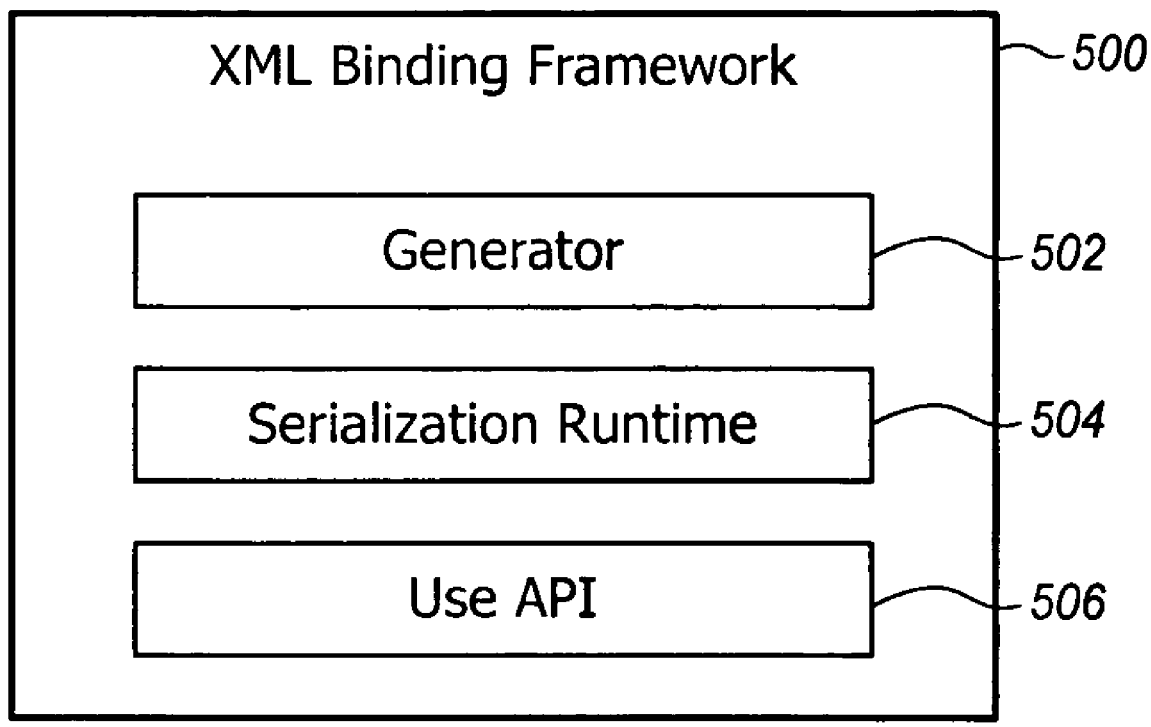
FIG. 5 illustrates an XML binding framework.

FIG. 5 illustrates an XML binding framework 500. The illustrated XML binding framework 500 is used to help generate classes, interfaces, and serialized. The framework 500 contains three components a generator 502, a serialization runtime 504, and a user API 506. The generator 502 is used as a tool to generate serialization framework and Java™ container classes using schema files and default mapping information. Serialization runtime 504 contains serialization framework implementation and the core set of serializers that are used for built-in schema types. Serialization runtime 504 serves as intermediary to convert the objects generated by the generator 502 to their corresponding XML fragments. An object refers to an instance of a class, which refers to a type. An XML fragment refers to an element of an XML file. The user API 506 contains interfaces and classes that applications use to work with Framework marshalling and unmarshalling utility functions.

Figure 6A:
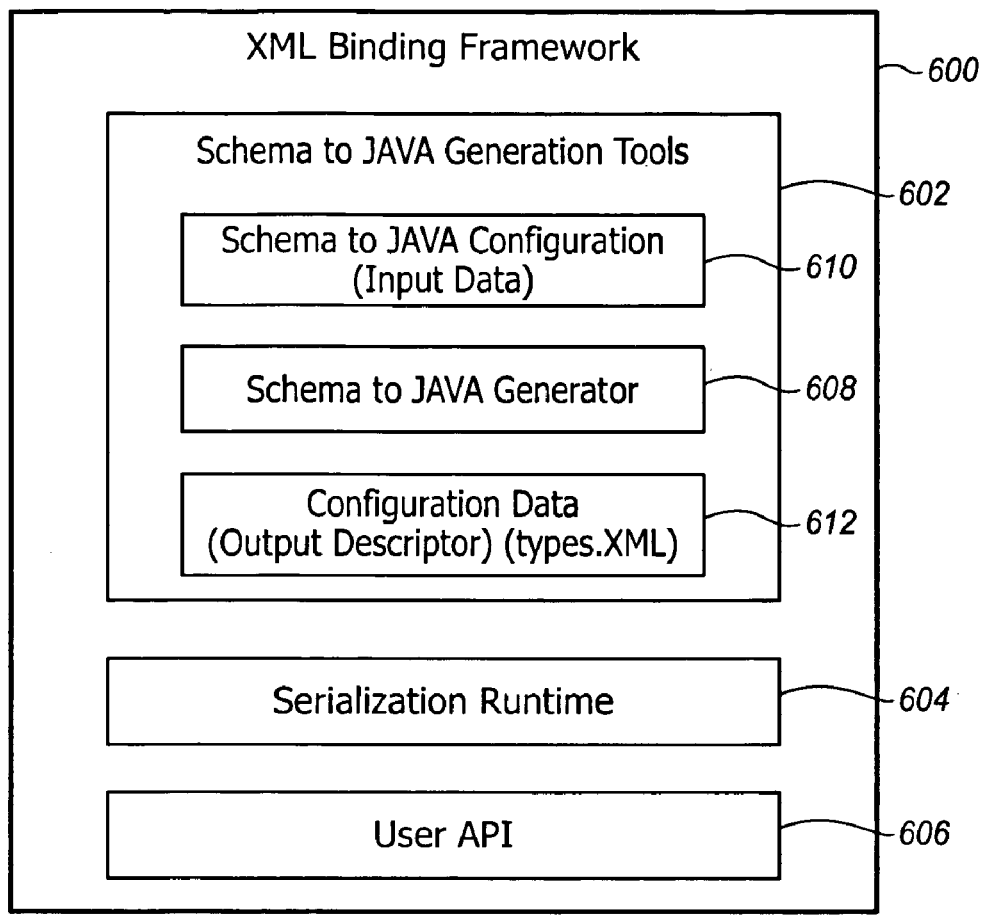
FIG. 6A illustrates an embodiment of an XML data binding framework.

FIG. 6A illustrates an embodiment of an XML data binding framework (binding framework) 600. The illustrated binding framework 600 includes schema to a Java™ generation tools (generation tools) 602, serialization runtime 604, and a user API 606. Generation tools 602 include a generator (e.g., schema to Java™ generator) 608, an input schema to Java™ configuration object (configuration object) 610, and an output configuration data (configuration data) 612. Schema to Java™ generator 608 is used to generate serialization framework, Java™ container files/classes, and the output descriptor 616 using schema (XSD) files and the configuration object 610. Serialization runtime 604 contains serialization framework implementation and a core set of serializers that are used for the built-in schema types. User API 612 contains interfaces and classes that applications use to work with the binding framework 600 for marshalling and unmarshalling utility functions, and the user API 106 is further used as an interface to the user (e.g., programmer and administrator).

In one embodiment, the configuration object 610 refers to an object including default and customized schema to Java™ configuration mapping information. The configuration object 610 may also include default mapping information, as necessitated. Further, the mapping information contained of the configuration object 610 is changeable to update and customization. Using the configuration object 610 and schema files, the schema to Java™ generator 608 generates Java™ classes/files/interfaces, serializers, and the configuration data 612. The configuration data 612 contains schema to Java™ mapping information and serializer information. The schema to Java™ mapping information at the configuration data 612 includes customized mapping information and may also include default mapping information for generating schema to Java™ mapping. The schema to Java™ mapping information at the configuration data 612 is then represented as the configuration object 610 for the schema to Java™ generation. The configuration data 612 resides at an external file (e.g., types.xml file).

Figure 6B:
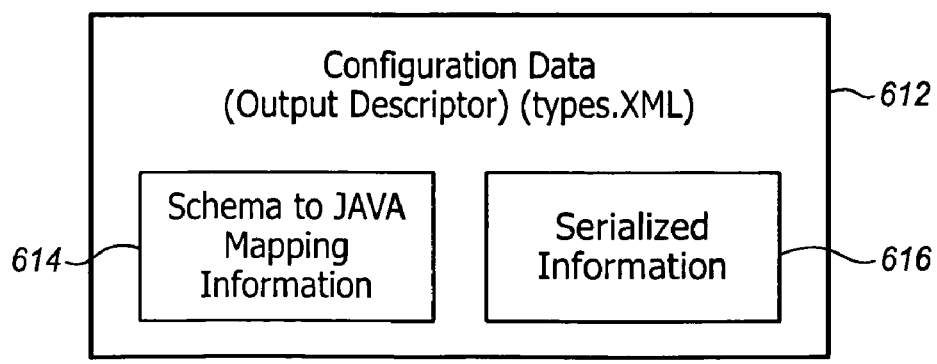
FIG. 6B illustrates an embodiment of configuration data.

FIG. 6B illustrates an embodiment of configuration data 612. In one embodiment, the configuration data 612 contains serializer information 616 and schema to Java™ mapping information 614. The serializer information 616 and the mapping information 614 are used to correlate between existing XML schema and existing Java™ types and to correlate between XML types and pluggable parametric serializers in a serialization framework. The mapping information 614 includes customized mapping information for customized schema to Java™ mapping. The mapping information 614 can also include default mapping information that is extracted from a default source, such as JAX-RPC, and then changed for customization and used to facilitate customized schema to Java™ mapping. Further, the mapping information 614 can be reused as input and output for the binding framework 600 both at runtime and generation time as part of the configuration object 610. The configuration data 612 is used as configuration object 610 to generate Java™ representation for XML schema types to generate schema to Java™ mapping, and to generate Java™ types using mapping rules, and to export mapping rules without actual type generation.

Figure 6C:
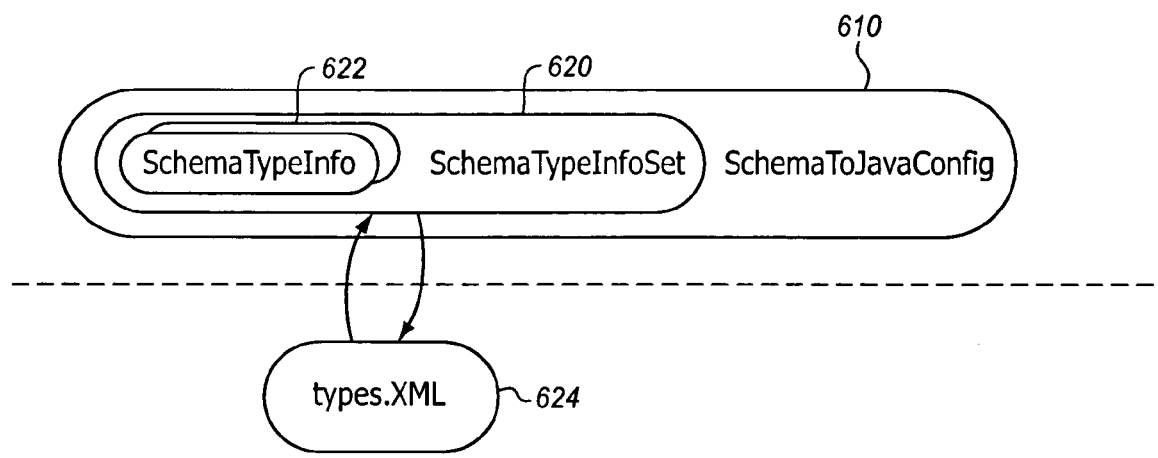
FIG. 6C illustrates an embodiment of a schema to Java™ configuration object.

FIG. 6C illustrates an embodiment of a schema to Java™ configuration object 610. The configuration object 610 contains configuration information, such as default and customized schema to Java™ mapping information. The configuration object 610 is a runtime object loaded into the memory. A schema to Java™ mapping object or Schema Type Info Set object (e.g., SchemaTypeinfoSet) 620 refers to an object, contained in the configuration object 610, representing information loaded from the configuration data 612 residing at an external file 624, such as a types.xml file. The configuration object 610 relates to the configuration data 612 in that the Schema Type Info Set object 620 refers to an entity that can be loaded and saved into an XML file, such as the types.xml file 624. The file 624 contain schema to Java™ mapping information 614 and serializer information 616. To start the schema to Java™ generator 608, the default configuration information can still be used, which can be set manually by the programmer. To achieve that, the configuration object 610 wraps the Schema Type Info Set object 620 and contains additional configuration properties. For example, the default schema to Java™ mapping information is represented by the configuration object 610, while the customized schema to Java™ mapping information (and some default mapping information) is represented by the Schema Type Info Set object 620 contained within the configuration object 610. Schema Type Info object (e.g., SchemaTypeInfo) 622 represents an interface of API to allow access to the configuration information represented by the configuration, Schema Type Info Set and Schema Type Info objects 610, 620, 622.

Figure 7:
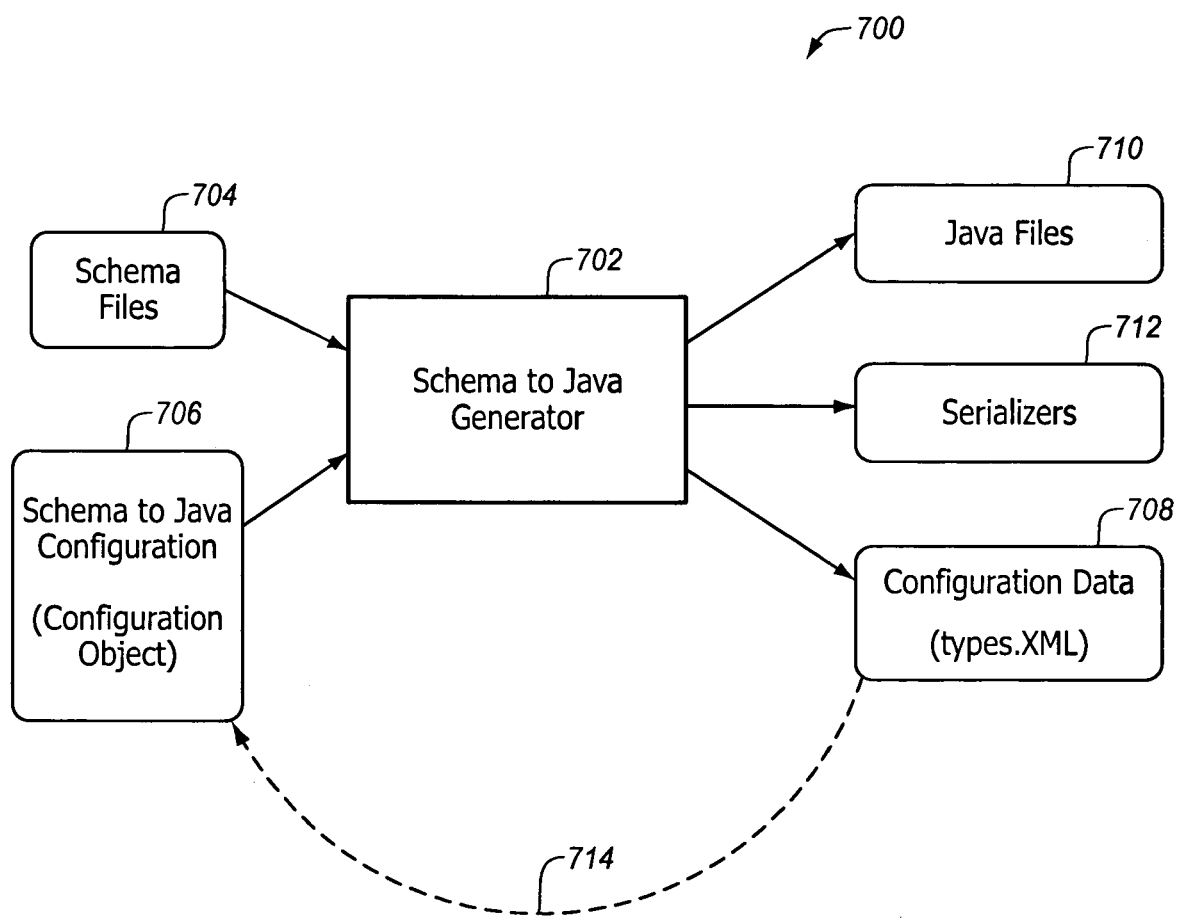
FIG. 7 illustrates architecture for schema to Java™ generation.

FIG. 7 illustrates an architecture 700 for schema to Java™ generation. In the illustrated embodiment, schema files 704 and a configuration object 706 are used to provide relevant configuration information to the schema to Java™ generator 702 for generating Java™ files 710, serializers 712, and configuration data 708. Schema files 704 include XSD files including information relating to XML types and other relevant information. In one embodiment, the configuration object 706 includes a runtime object loaded into the memory. The configuration object 706 is an object (e.g., SchemaTypeInfoSet) that represents information loaded from an XML file, such as the types.xml file. The types.xml file contains the configuration data 708. Further, the configuration object 706 represents an entity that can be loaded and saves into an external XML file, serving as a runtime representation of the external file. The configuration object 706 may also contain a Schema Type Info object serving as an interface to provide access to the configuration object 706 and the Schema Type Info Set object.

In one embodiment, the schema to Java™ mapping information contained in the configuration data 708 saved at the types.xml file can then be loaded as the configuration object 706. For example, the original default mapping information can be amended at generation resulting in customized mapping information at the configuration data 708 residing at the types.xml file which can then be reloaded as the configuration object 706. The configuration data 708 further includes serializer information (e.g., names of serializers) relating to configured serializers 712 to facilitate initialization of serializers 712, and Java™ files, classes, and/or interfaces.

In one embodiment, the customized and configured information relating to schema to Java™ mapping is used to generate customized schema to Java™ mapping and initialization of the serialization framework after the generation process is completed. The mapping information may include description of relationships between the XML schema and Java™ classes or files 710. Such mapping information is further used to identify how and which Java™ files or classes 710 are to be generated and loaded. Further, the configuration data 708 can be modified and customized, as necessitated or desired. For example, to change the nature of schema to Java™ mapping, information such as class names, field names, and the like, can be amended to achieve the desired results. The configuration data also includes Java™ class information (e.g., names of Java™ classes) relating to generated Java™ classes 710.

In one embodiment, the configuration data 708 includes a list of serializers 712, description of relationships between serializers 712, and the necessary files that the runtime serializers can load. A serializer 712 refers to a special class with special functionality to implement special interfaces and to serialize specific Java™ objects into specific a XML format. In other words, a serializer 712 provides an interface to the parameters to an object which can be converted into XML or vice versa. Furthermore, Java™ representation for XML schema types is generated, Java™ types using customized mapping rules are generated, mapping rules without type generation are exported, and in some instances, Java™ types may also be generated using default mapping rules.

Further, using the contents (e.g., default and customized schema to Java™ mapping information) represented by the configuration object 706 and the configuration data 708. The schema to Java™ generator 702 can be used to integrate multiple web services implementations into one binding framework so that the reliance on a single default implementation is not necessary. For example, the illustrated architecture 700 can have a single binding framework that can be used for those schema to Java™ generations that are not just specifically fitted for the requirements of a single or default implementation (e.g., JAX-RPC), but can also be used with various other web services implementations (e.g., JAX-RPC, Portals, XI, and WS runtime mapping) in the same XML binding framework.

Using the configuration object 706 and the configuration data 708, the functionality of the binding framework can be further extended in usability to include various other functions. Such other functions include describing the mapping of XML schema to Java™ via schema to Java™ mapping information, initializing serialization runtime, and using plugging extensions to serialization runtime by adding XML type-specific serializers and/or Java™ class-specific serializers that are invoked by serialization runtime.

Figure 8:
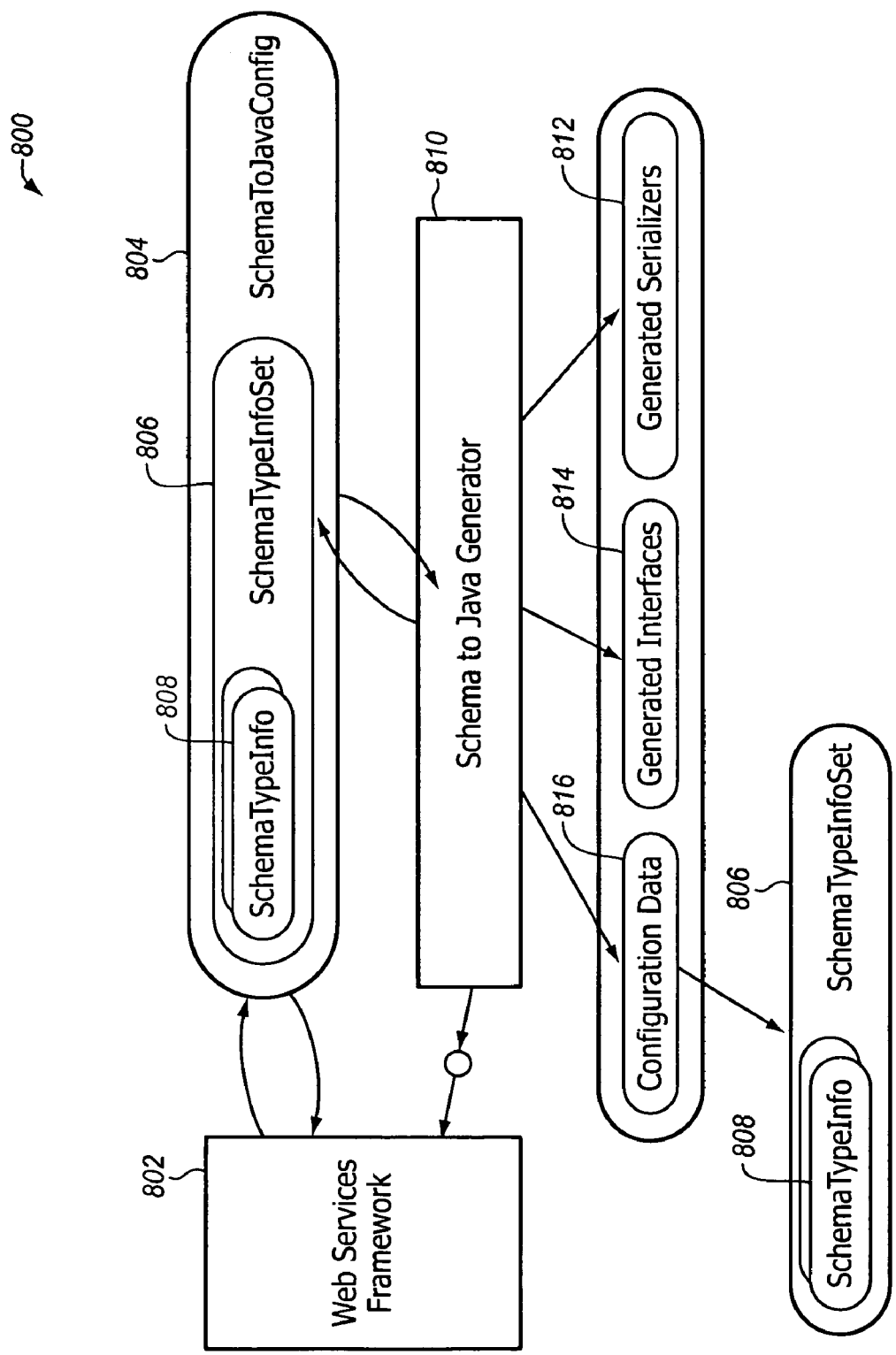
FIG. 8 illustrates an embodiment of a schema to Java™ generation mechanism.

FIG. 8 illustrates an embodiment of a schema to Java™ generation mechanism 800. The illustrated mechanism 800 includes and integrates various components and multiple web services implementations into a single web services framework 802. This single web services framework 802 is used for schema to Java™ generation that is fitted for and satisfies the requirements of a default implementation (e.g., JAX-RPC), but that it is also fitted for and satisfies the requirements of other implementations (e.g., Portals, XI, and WS runtime mapping).

In one embodiment, the generation process is initiated at the web services framework 802 with triggers the generation of schema to Java™ generator 810. In the illustrated embodiment, the schema to Java™ generator 810 generates serializers 812, interfaces 814, and configuration data 816. The configuration data 816 includes serialization information and schema to Java™ mapping information at an external XML file. In one embodiment, the configuration data 816 is generated by providing customized configuration object 804 to the schema to Java™ generator 810 or, in another embodiment, default mapping information is provided to the schema to Java™ generator 810, but it is then amended at the schema to Java™ generator 810 to obtain particular customized configuration data 816.

In one embodiment, as illustrated, the content of the configuration data 816 from the external file is then used as the Schema Type Info Set object 806 which provides customized schema to Java™ mapping information. The Schema Type Info Set object 806 is wrapped with other necessary and/or default mapping information as represented by the configuration object 804. Further, a Schema Type Info object 808 is provided to allow access to the mapping information of the configuration object 804 and the Schema Type Info Set object 806. The generation process is triggered with the loading of the schema mapping information of configuration object 804 and the Schema Type Info Set object 806. The generation is then invoked and results are obtained.

In one embodiment, configuration information for each schema type can be described using the Schema Type Info object 808. This configuration information may include the description of which schema type to what Java™ type is mapped and which serializer is responsible for this schema type and what the constructor parameters are going to be for this serializer. The configuration information may further include properties that customize the schema to Java™ field mappings. Also, schema mappings of the Schema Type Info object 808 are combined in schema mapping sets in the Schema Type Info Set object 806. The Schema Type Info Set object 806 can also include default schema mapping information, as necessitated or desired.

For those types that do not have mapping information represented by the Schema Type Info Set object 806, the schema to Java™ generator 810 can generate serializers and Java™ classes and can add the mapping information to the Schema Type Info Set object 806. There may be separation between the schema to Java™ mapping and schema to serailizer mapping in the information represented by the Schema Type Info object 808 and the Schema Type Info Set object 806. This is, for example, to reuse serializers in multiple use cases with minimum modifications. Also, for example, one serializer with different parameters can be used for different simple types.

Figure 9:
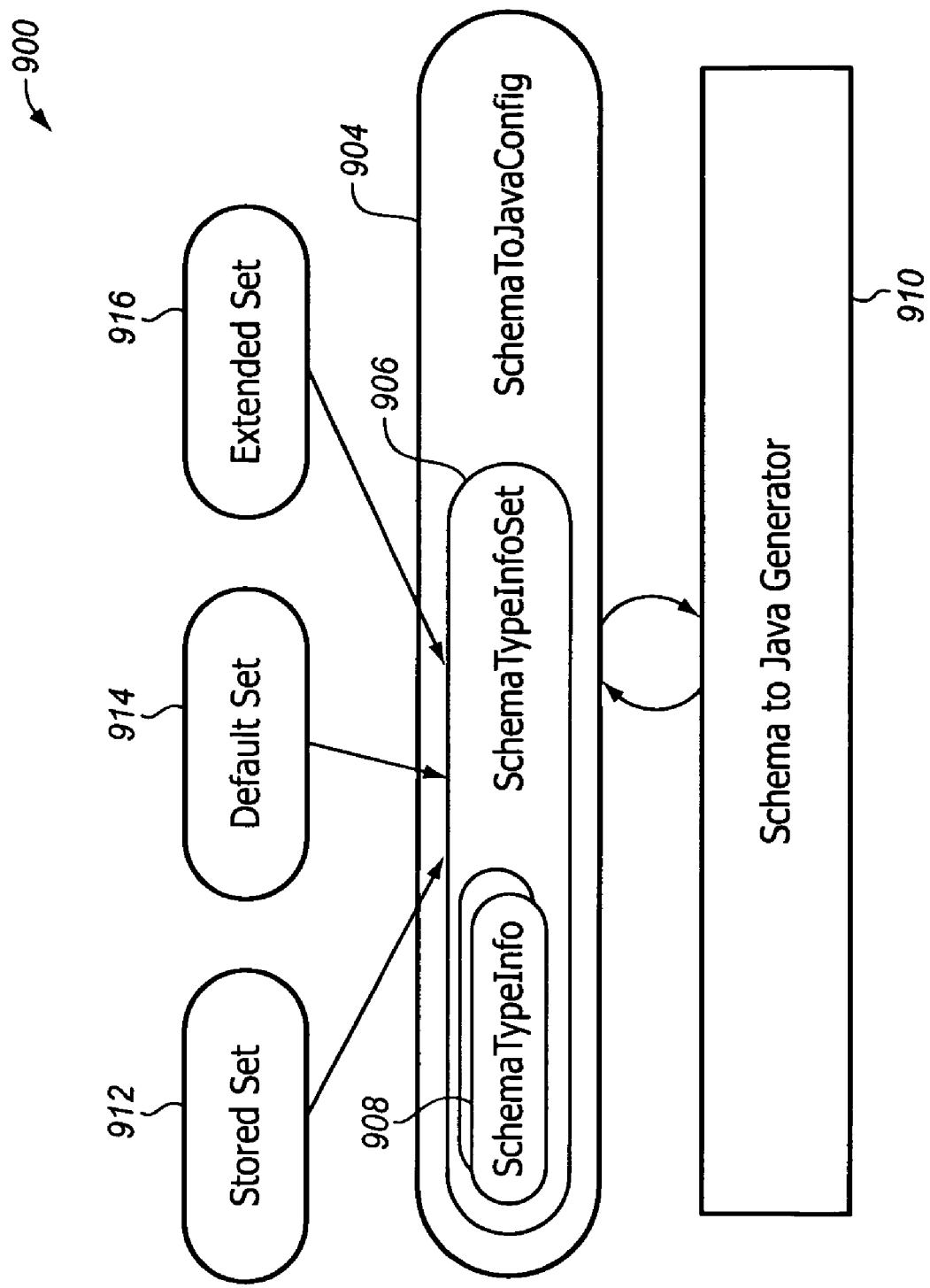
FIG. 9 illustrates an embodiment of a schema to Java™ generation mechanism.

FIG. 9 illustrates an embodiment of a schema to Java™ generation mechanism 900. In the illustrated embodiment various sets 912-916 of mapping information as shown. For example, the default set 914 represents the default schema to Java™ mapping. The stored set 912 represents customized mapping information taken from a sources like the JSR 109 deployment descriptor (e.g., type-mapping.xml). The extended set 916 represents an extended set that is used to support portals.

Figure 10:
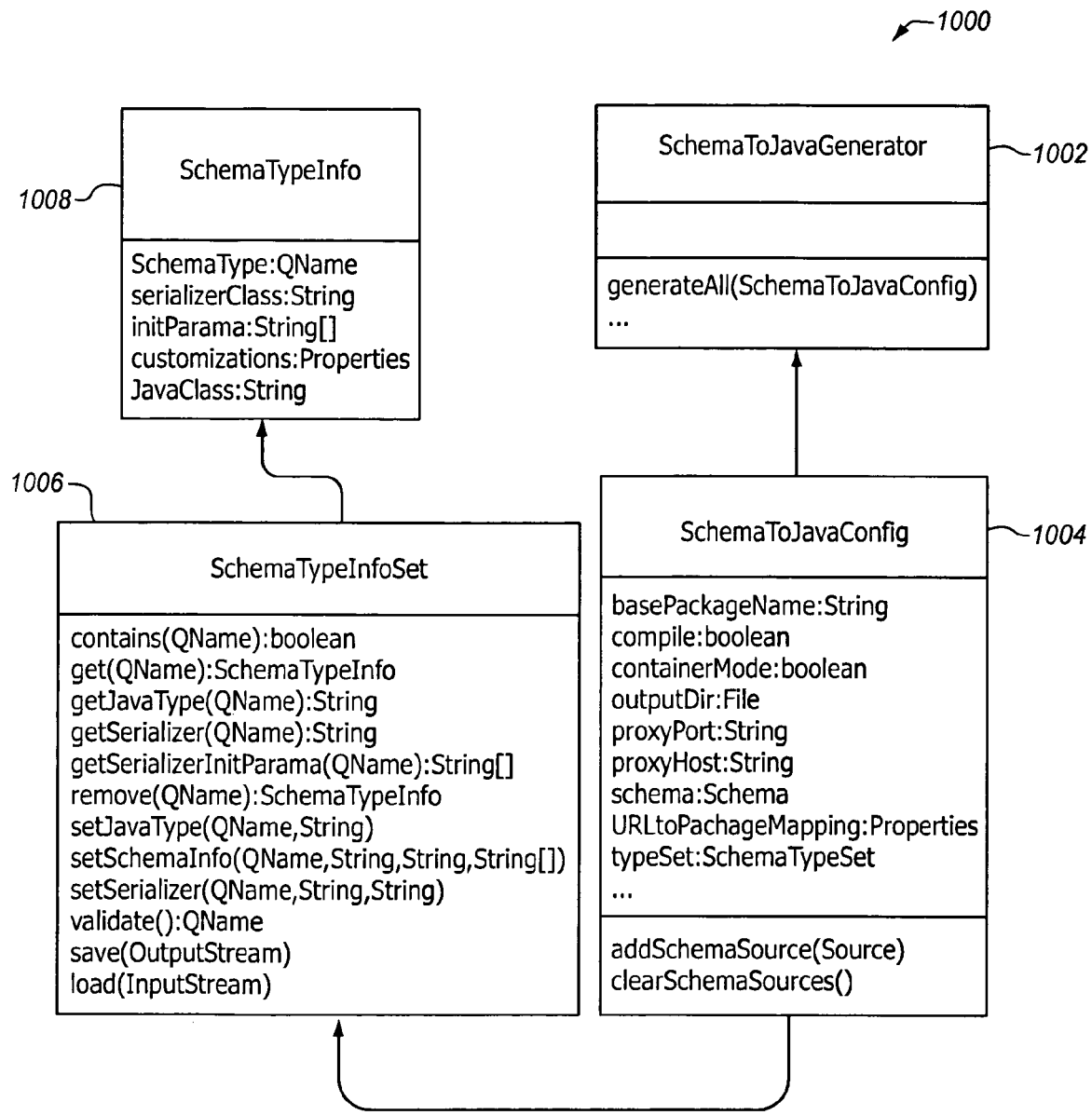
FIG. 10 illustrates an embodiment of a configuration structure.

FIG. 10 illustrates an embodiment of a configuration structure 1000. A schema to Java™ generator is illustrated 1002 as having the loading command of "All". In one embodiment, other commands like "Load", "Container", and "Framework" can also be used to obtain customized results. For example, Load helps obtain merely configuration data. Container provides configuration data and Java™ files/interfaces. The command for Framework provides the configuration data and serializers, while the All command provides them all, i.e., configuration data, serializers, and Java™ files/interfaces.

As illustrated, configuration object 1004 is an object representing default mapping information that could include manual mapping information as set forth in the configuration object 1004 by the programmer or developer. Schema Type Info Set object 1006 and Schema Type Info object 1008 are also illustrated representing schema to Java™ mapping information (including default and/or customized mapping information) and interfaces necessary to allow access to such information.

Figure 11:
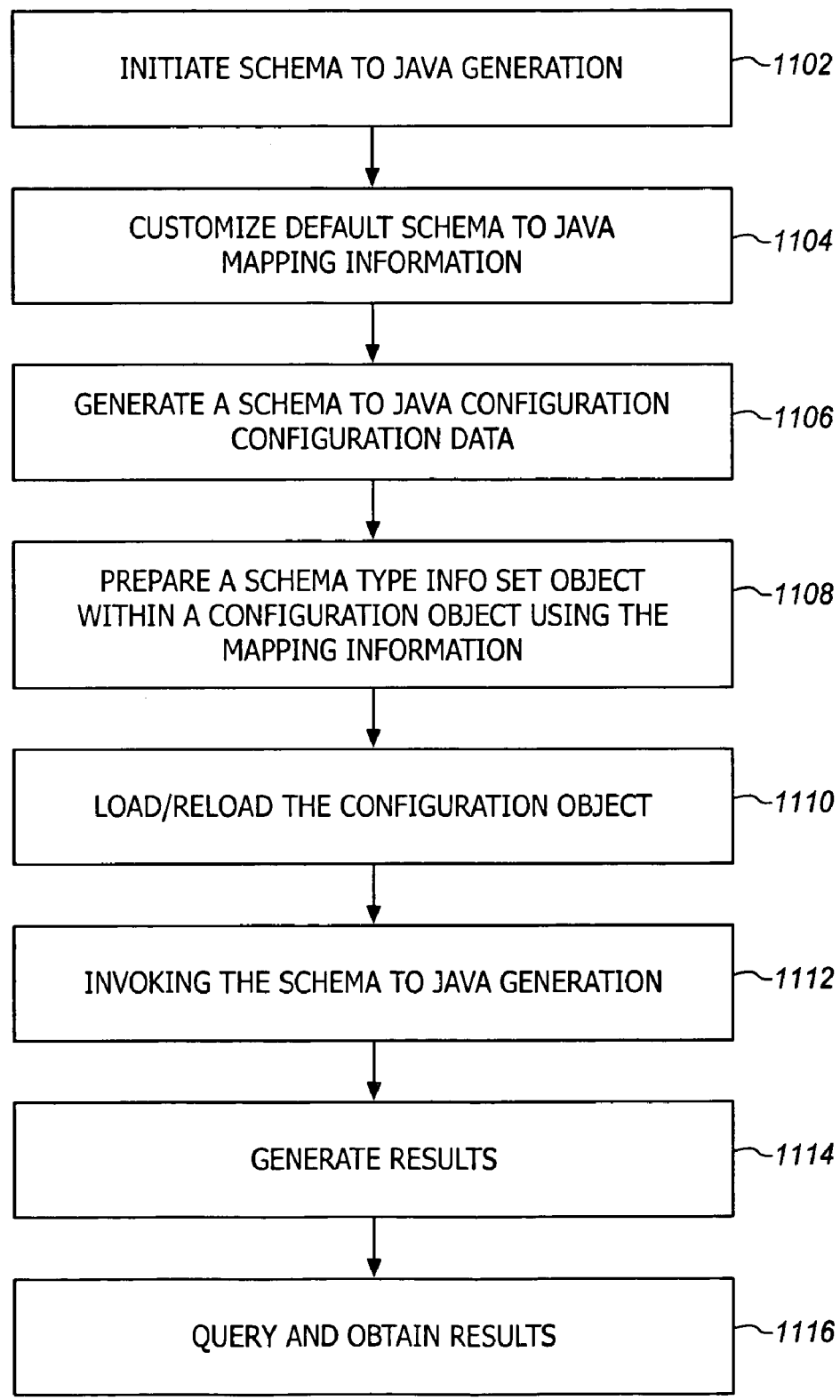
FIG. 11 illustrates a process for an embodiment of schema to Java™ generation.

FIG. 11 illustrates a process for an embodiment of schema to Java™ generation. Initiating a schema to Java™ generator via a web services framework at processing block 1102. The schema to Java™ generator may be initiated with schema files and mapping information. The mapping information includes default mapping information. At processing block 1104, the default mapping information is then amended to include customized schema to Java™ mapping information. At processing block 1106, a schema to Java™ configuration data is generated having customized schema to Java™ mapping information and serializer information. A Schema Type Info Set object at a schema to Java™ configuration object is prepared using the customized mapping information extracted from the configuration data at an external XML file (e.g., types.xml) at processing block 1108. The Schema Type Info Set object at the configuration object represents customized schema to Java™ mapping information, but it also can contain default mapping information. Similarly, the configuration object includes default mapping information. Further, a Schema Type Info object is provided at the configuration object as an interface to provide access to the mapping information at the configuration and the Schema Type Info Set object.

At processing block 1110, the configuration object, including the Schema Type Info Set object, is loaded or reloaded with its default and customized mapping information. With the start of the mapping information and schema files loading, the generation process is invoked at processing block 1112. At processing block 1114, the schema to Java™ generator generates results including schema to Java™ configuration data, serializers, and Java™ files, classes and/or interfaces. The results are then queried and obtained in accordance with the command placed at the initiation of the generation process at processing block 1116. As described elsewhere in this document, the command includes Load, Container, Framework, and/or All to help customize the results according to the user's needs or desires.

Figure 12:
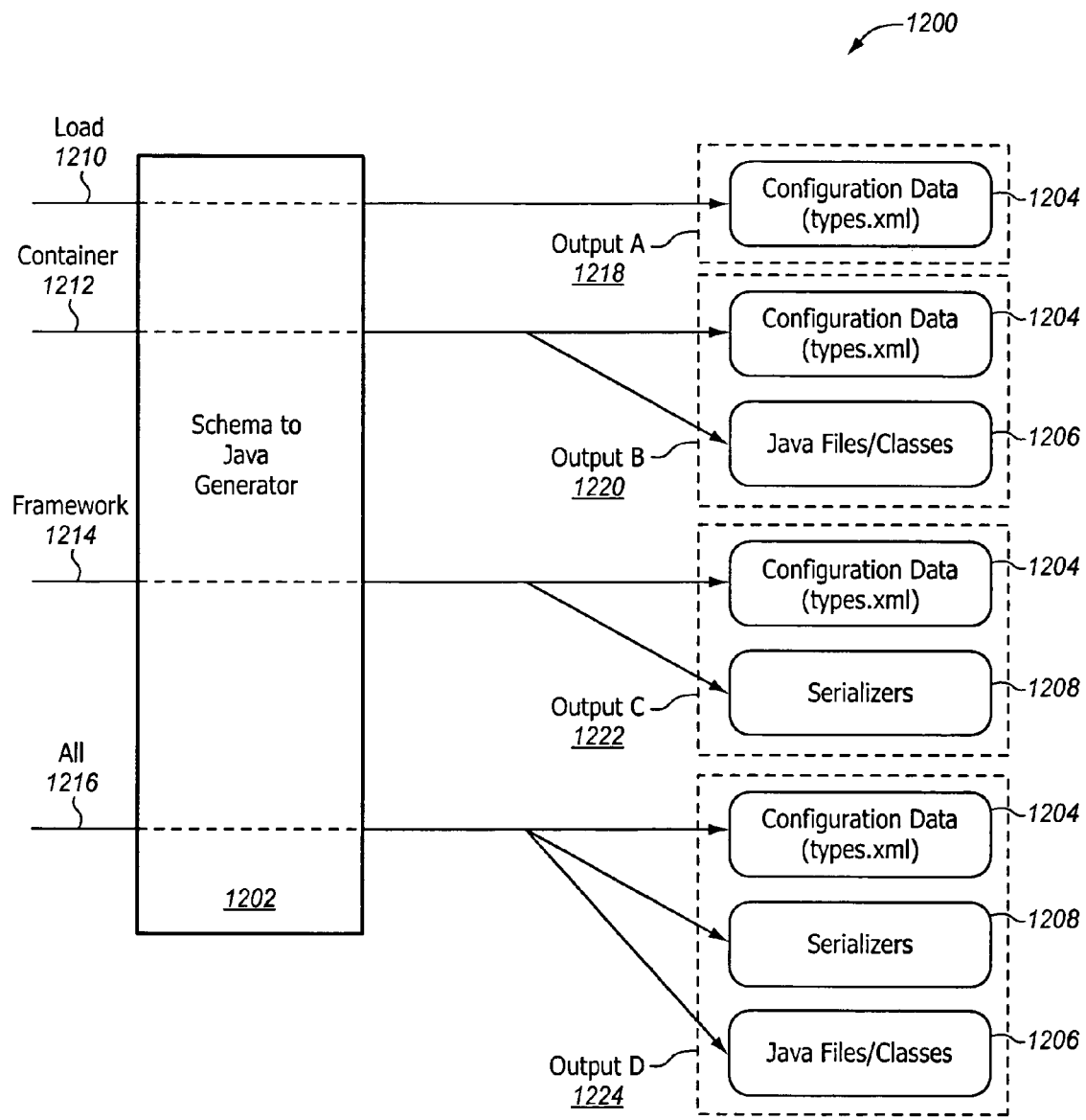
FIG. 12 illustrates an embodiment of a transactional sequence for initiating a schema to Java™ generator to obtain various outputs.

FIG. 12 illustrates an embodiment of a transactional sequence for initiating a schema to Java™ generator 1202 to obtain various outputs 1218-1224. In one embodiment, the schema to Java™ generator 1202 is used by calling a method for "Load" 1210 (e.g., <.generateLoad(SchemaTJava™ Config)>) to output A 1218 having configuration data 1204. Similarly, calling a method for "Container" 1212 (e.g., <.generateContainer(SchemaTJava™ Config)>) helps obtain output B 1220 having a combination of configuration data 1204 and Java™ files/classes/interfaces 1206. By calling a method for "Framework" (e.g., <.generateFramework(SchemaTJava™ Config)>), output C 1222 is obtained having combination of configuration data 1204 and serializers 1208. Another method for "All" can be called (e.g., < generateAll(SchemaTJava™ Config)>) to obtain output D 1224 having configuration data 1204, serializers 1208, and Java™ files 1206.

Figure 13:
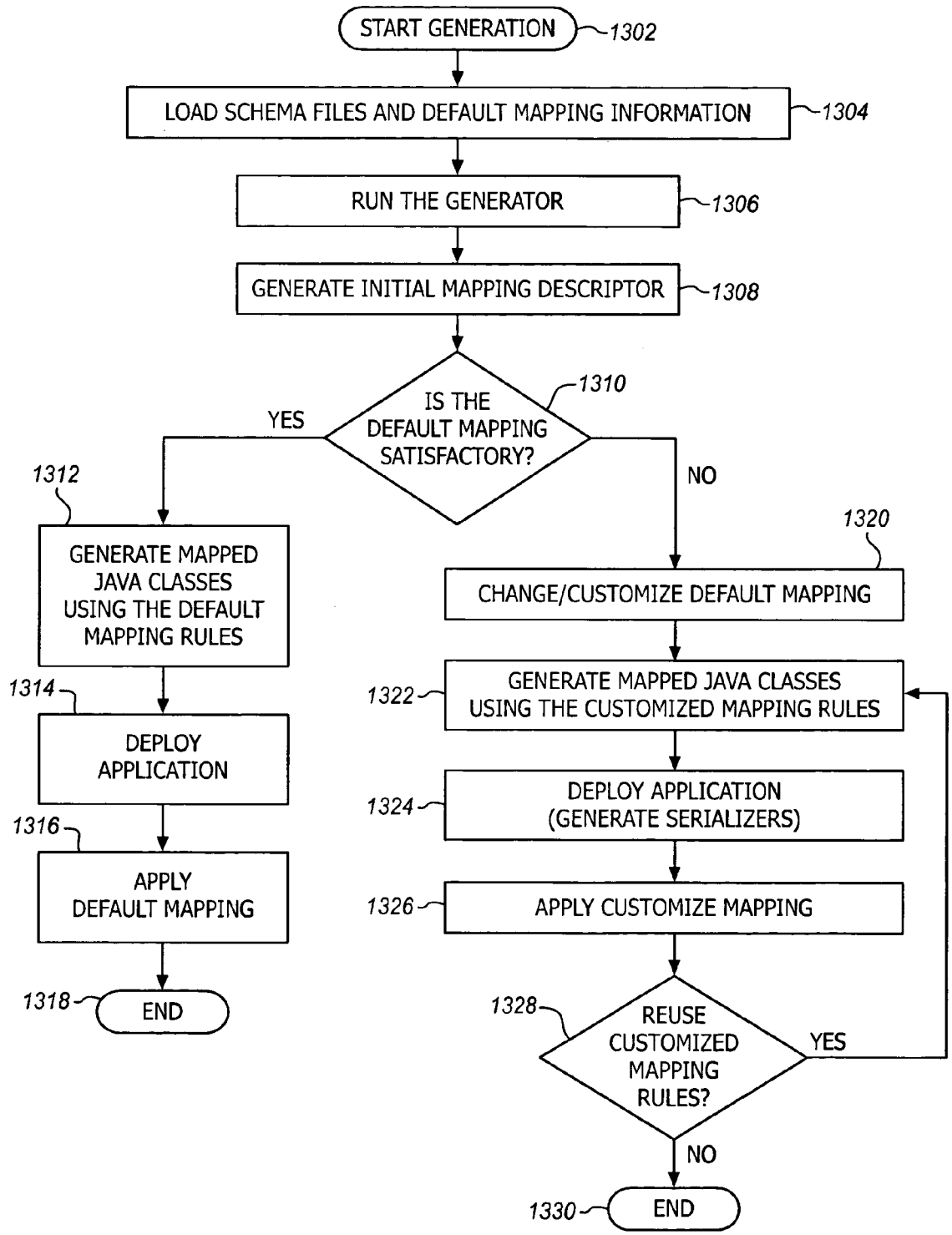
FIG. 13 illustrates a process for schema to Java™ generation.

FIG. 13 illustrates a process for schema to Java™ generation. Generation is initiated at block 1302. Schema files and default mapping information are loaded at processing block 1304. Schema files include XSD files that can be obtained from sources, such as WSDL or standalone XML schema. Also, XSD types are mapped to Java™ classes to generate serialization tools that can convert Java™ objects to XML and vice versa. Using the schema files and default mapping information, an initial default schema to Java™ mapping descriptor (e.g., configuration data) at an external file (e.g., types.xml) is created at processing block 1308. In one embodiment, the default mapping behavior of the serialization framework is necessitated as default mapping contains the XSD component names and details of they are mapped to Java™ .For each XSD type, a Java™ type is defined and flagged if this Java™ type exists or is a name to be generated by the generator type. There may also be a list of elements and attributes of complex types and mapped default Java™ field names.

At decision block 1310, whether default mapping rules are satisfactory is determined. If they are satisfactory, mapped Java™ classes using default mapping rules are generated at processing block 1312. At processing block 1314, the application is deployed which includes using default schema to Java™ mapping and XSD files to generate XML serializers for the deployed Java™ classes. Further, the serializer information is appended to the schema to Java™ mapping (e.g., at types.xml). At processing block 1316, proper default schema to Java™ mappings are applied, Java™ classes are deployed, and the XML serialization framework is used to serialize these classes to proper XML with proper mappings applied. The process ends at termination block 1318.

If default mapping rules are not satisfactory, changes are made to default mapping rules to customize them at processing block 1320. In one embodiment, changing the default mapping rules to customized mapping rules facilitates generation of a customized schema to Java™ mapping descriptor at an external file (e.g., types.xml) having customized mapping information and serialization information. Further, mapped classes using customized mapping rules are generated at processing block 1322. The application is then deployed at processing block 1324 including using customized schema to Java™ mapping and XSD files to generate XML serializers for the deployed Java™ classes. Further, the serializer information is appended to the schema to Java™ mapping at the external file. At processing block 1326, proper customized schema to Java™ mappings are applied, Java™ classes/files/interfaces are deployed, and the XML serialization framework is used to serialize these classes to proper XML with proper mappings applied.

At decision block 1328, whether customized mapping rules are to be reused is determined. If they are not to be used, the process ends at termination block 1330. However, if customized mapping rules are to be reused, the process continues with using customized mapping rules with processing block 1322. In one embodiment, the configuration data includes customized mapping information at an external XML file. Stated differently, the mapping information (customized or default) that is stored at an external file within the schema to Java™ mapping descriptor can be loaded or reloaded from the external file as an object (e.g., represented as schema or configuration object) or can be changed by the schema to Java™ generator and saved back to the configuration data.

The loading and reloading of the default and customized mapping information is represented by objects including using a schema to Java™ configuration object (e.g., SchemaToJava™ Config) for loading such mapping information. For example, a configuration object includes a Java™ object that is used to configure the schema to Java™ generation process. The configuration object further includes a Schema Type Info Set object that contains the schema to Java™ mapping information and serializer information. he configuration object may include default mapping information surrounding a Schema Type Info Set object having customized mapping information. Further, the Schema Type Info Set object includes Schema Type Info object as an interface to provide access to the mapping information represented by the configuration and Schema Type Info Set object.

Figure 14:
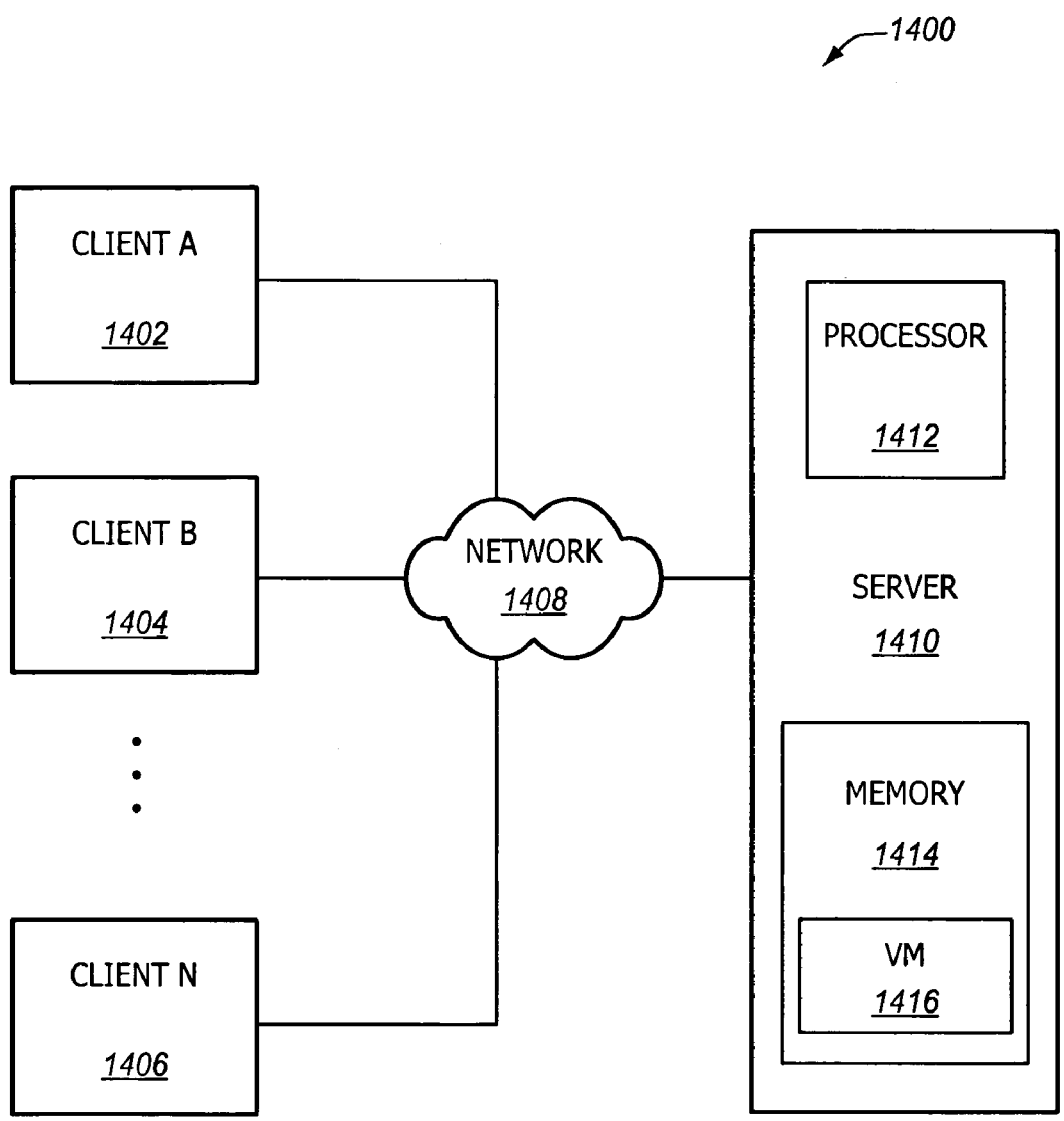
FIG. 14 illustrates an exemplary client/server system used for implementing an embodiment of the invention.

FIG. 14 illustrates an exemplary client/server system 1400 used in implementing one or more embodiments of the invention. In the illustrated embodiment, a network 1408 links a server 1410 with various client systems A-N 1402-1406. The server 1410 is a programmable data processing system suitable for implementing apparatus, programs, or methods in accordance with the description. The server 1410 provides a core operating environment for one or more runtime systems that process user requests. The server 1410 includes a processor 1412 and a memory 1414. The memory 1414 can be used to store an operating system a Transmission Control Protocol/Internet Protocol (TCP/IP) stack for communicating over the network 1408, and machine-executable instructions executed by the processor 1412. In some implementations, the server 1410 can include multiple processors, each of which can be used to execute machine-executable instructions.

The memory 1414 can include a shared memory area that is accessible by multiple operating system processes executing at the server 1410. An example of a suitable server to be implemented using the client/server system 1400 may include J2EE compatible servers, such as the Web Application Server developed by SAP AG of Walldorf, Germany, or the WebSphere Application Server developed by International Business Machines Corp. (IBM®) of Armonk, N.Y.

Client systems 1402-1406 are used to execute multiple applications or application interfaces. Each instance of an application or an application interface can constitute a user session. Each user session can generate one or more requests to be processed by the server 1410. The requests may include instructions or code to be executed on a runtime system (e.g., the virtual machine (VM) 1416) on the server 1410. A VM 1416 is an abstract machine that can include an instruction set, a set of registers, a stack, a heap, and a method area, like a real machine or processor. A VM 1416 essentially acts as an interface between program code and the actual processor or hardware platform on which the program code is to be executed. The program code includes instructions from the VM instruction set that manipulates the resources of the VM 1416.

Figure 15:
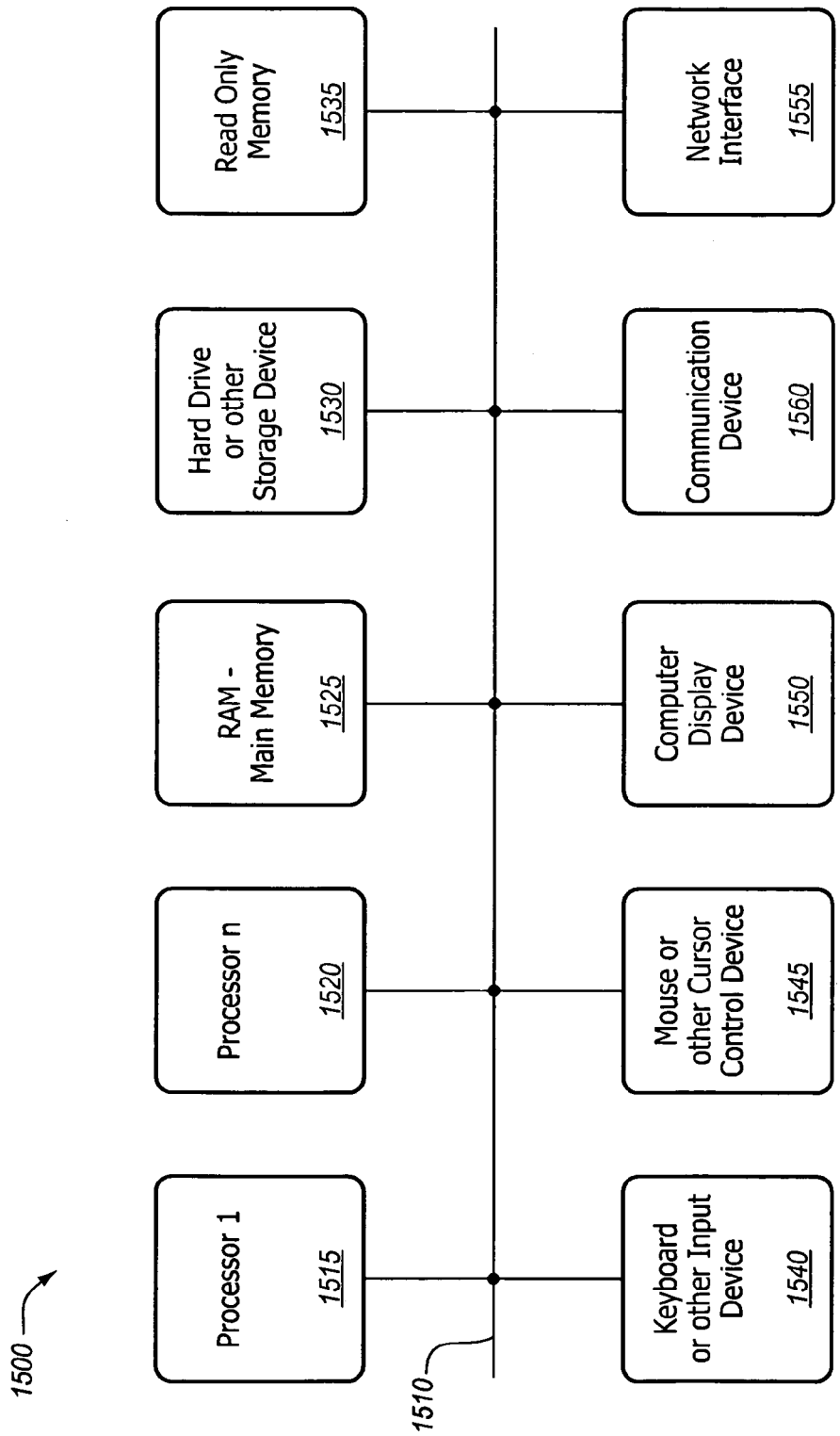
FIG. 15 is an exemplary computer system used in implementing an embodiment of the invention.

FIG. 15 is an exemplary computer system 1500 used in implementing an embodiment of the present invention. In this illustration, a system 1500 comprises a bus 1510 or other means for communicating data. The system 1500 includes one or more processors, illustrated as shown as processor 1 1515 through processor n 1520 to process information. The system 1500 further comprises a random access memory (RAM) or other dynamic storage as a main memory 1525 to store information and instructions to be executed by the processor 1515 through 1520. The RAM or other main memory 1525 also may be used for storing temporary variables or other intermediate information during execution of instructions by the processors 1515 through 1520.

A hard drive or other storage device 1530 may be used by the system 1500 for storing information and instructions. The storage device 1530 may include a magnetic disk or optical disc and its corresponding drive, flash memory or other non-volatile memory, or other memory device. Such elements may be combined together or may be separate components. The system 1500 may include a read only memory (ROM) 1535 or other static storage device for storing static information and instructions for the processors 1515 through 1520.

A keyboard or other input device 1540 may be coupled to the bus 1510 for communicating information or command selections to the processors 1515 through 1520. The input device 1540 may include a keyboard, a keypad, a touch-screen and stylus, a voice-activated system, or other input device, or combinations of such devices. The computer may further include a mouse or other cursor control device 1545, which may be a mouse, a trackball, or cursor direction keys to communicate direction information and command selections to the processors and to control cursor movement on a display device. The system 1500 may include a computer display device 1550, such as a cathode ray tube (CRT), liquid crystal display (LCD), or other display technology, to display information to a user. In some environments, the display device may be a touch-screen that is also utilized as at least a part of an input device. In some environments, the computer display device 1550 may be or may include an auditory device, such as a speaker for providing auditory information.

A communication device 1550 may also be coupled to the bus 1510. The communication device 1550 may include a modem, a transceiver, a wireless modem, or other interface device. The system 1500 may be linked to a network or to other device using via an interface 1555, which may include links to the Internet, a local area network, or another environment. The system 1500 may comprise a server that connects to multiple devices. In one embodiment the system 1500 comprises a Java™ ® compatible server that is connected to user devices and to external resources.

While the machine-readable medium 1530 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1500 and that causes the machine to perform any one or more of the methodologies of the present invention. The term "machine-readable medium" shall accordingly be taken to include, but not be limited to, solid-state memories, optical and magnetic media, and carrier wave signals.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD-ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Furthermore, it is appreciated that a lesser or more equipped computer system than the example described above may be desirable for certain implementations. Therefore, the configuration of system 1500 may vary from implementation to implementation depending upon numerous factors, such as price constraints, performance requirements, technological improvements, and/or other circumstances.

It is noted that processes taught by the discussion above can be practiced within various software environments such as, for example, object-oriented and non-object-oriented programming environments, Java™ based environments, such as a J2EE environment or environments defined by other releases of the Java™ standard), or other environments (e.g., a .NET environment, a Windows/NT environment each provided by Microsoft Corporation).

It should be noted that, while the embodiments described herein may be performed under the control of a programmed processor, such as processors 1515 through 1520, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method, comprising:
   reading program code from memory and processing said program code with one or more processors to perform the following:
   generating a set of configuration data for a web service, said set of configuration data including:
      i) a design time component, said design time component being an identity of a serializer
      ii) a runtime component, said runtime component being an identity of a classfile;
   creating a design for said web service;
   identifying said serializer from said set of configuration data and using said serializer to produce, from said design, a markup language description of said web service, and, identifying said classfile from said set of configuration data and using said classfile to generate a runtime instance of said web service;
   wherein the following is performed to generate classfiles used to generate said runtime instance of said web service:
   providing said set of configuration data and a schema to a schema-to-Java™ generator:
   generating Java™ classfiles with said schema-to-Java™ generator in accordance with said schema, said classfile being one of said Java™ classfiles.

2. The method of claim 1 wherein said markup language description is an eXtensible Markup Language (XML) description.

3. The method of claim 1 further comprising:
   getting and setting said classfile by referring to a name of a construct within said set of configuration data that contains both said identity of said classfile and said identity of said serializer.

4. The method of claim 3 further comprising:
   getting and setting said serializer by referring to said name.

5. An article of manufacture comprising program code stored on a machine readable storage medium, wherein, when said program code is read from said machine readable medium and processed with one or more processors, the following method is performed:
   generating a set of configuration data for a web service, said set of configuration data including:
      i) a design time component, said design time component being an identity of a serializer
      ii) a runtime component, said runtime component being an identity of a classfile;
   creating a design for said web service;
   identifying said serializer from said set of configuration data and using said serializer to produce, from said design, a markup language description of said web service, and, identifying said classfile from said set of configuration data and using said classfile to generate a runtime instance of said web service;
   wherein the following is performed to generate classfiles used to generate said runtime instance of said web service:
   providing said set of configuration data and a schema to a schema-to-Java™ generator:
   generating Java™ classfiles with said schema-to-Java™ generator in accordance with said schema, said classfile being one of said Java™ classfiles.

6. The article of manufacture of claim 5 wherein said markup language description is an eXtensible Markup Language (XML) description.

7. The article of manufacture of claim 5 further comprising:
getting and setting said classfile by referring to a name of a construct within said set of configuration data that contains both said identity of said classfile and said identity of said serializer.

8. The article of manufacture of claim 7 further comprising:
getting and setting said serializer by referring to said name.

9. A computing system comprising one or more processors and program code stored in memory, wherein, when said program code is read from said memory and processed with one or more processors, the following method is performed:
generating a set of configuration data for a web service, said set of configuration data including:
  i) a design time component, said design time component being an identity of a serializer
  ii) a runtime component, said runtime component being an identity of a classfile;
creating a design for said web service;
identifying said serializer from said set of configuration data and using said serializer to produce, from said design, a markup language description of said web service, and, identifying said classfile from said set of configuration data and using said classfile to generate a runtime instance of said web service;
wherein the following is performed to generate classfiles used to generate said runtime instance of said web service:
providing said set of configuration data and a schema to a schema-to-Java™ generator:
generating Java™ classfiles with said schema-to-Java™ generator in accordance with said schema, said classfile being one of said Java™ classfiles.

10. The computing system of claim 9 wherein said markup language description is an eXtensible Markup Language (XML) description.

11. The computing system of claim 9 further comprising:
getting and setting said classfile by referring to a name of a construct within said set of configuration data that contains said identity of said classfile and said identity of said serializer.

12. The computing system of claim 11 further comprising:
getting and setting said serializer by referring to said name.

13. The computing system of claim 12 wherein said markup language description is an eXensible Markup Language (XML) description.

* * * * *